J. B. BOWDEN.
MACHINE FOR MOLDING STAIR-RAIL WREATHS.

No. 191,748. Patented June 12, 1877.

Attest:
Edmund N. Hatcher
W. H. Griffith

Inventor:
John B. Bowden.
Per. Herman F. Achauer,
Atty.

UNITED STATES PATENT OFFICE.

JOHN B. BOWDEN, OF ZANESVILLE, OHIO, ASSIGNOR TO HIMSELF, WILLIAM H. GRIFFITH, JR., AND HERMAN F. ACHAUER, OF SAME PLACE.

IMPROVEMENT IN MACHINES FOR MOLDING STAIR-RAIL WREATHS.

Specification forming part of Letters Patent No. 191,748, dated June 12, 1877; application filed April 19, 1877.

*To all whom it may concern:*

Be it known that I, JOHN B. BOWDEN, of the city of Zanesville, in the county of Muskingum and State of Ohio, have invented a new and useful Machine for Molding Stair-Rail Wreaths, which invention is fully set forth in the following specification, reference being had to the accompanying drawings.

Figure 1:
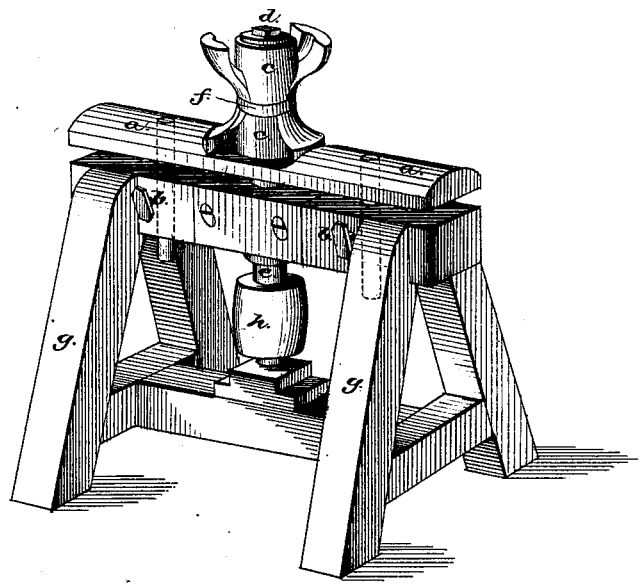

The object of my invention is to form a mold on stair-rail wreaths, to accomplish which I use an adjustable semicircular table, $a$, in conjunction with a bit, $c\ c$, and collar $f$, as shown in the perspective view, Figure 1 of the accompanying drawing.

Figure 2:
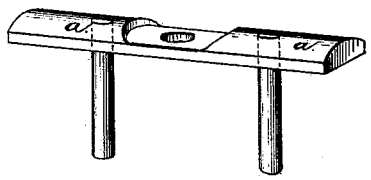
Figure 3:
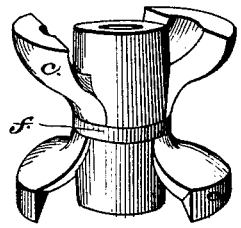
Figure 4:

The table $a$ is made adjustable by means of set-screws $b\ b$, so that the same may be adjusted to suit bits $c\ c$ of different size and wreaths of different thickness, and it is made semicircular in order to allow wreaths of any twist to touch the top of the table $a$ as it passes the bit $c\ c$ in molding. Fig. 2 represents the table $a$ detached. The bit $c\ c$ is in two parts, and secured to shaft $e$ by nut $d$. The collar $f$ is attached to bit $c\ c$, as shown by Fig. 3, which obviates the necessity of using a pattern, as it prevents the bit $c\ c$ from cutting deeper than is required to form the mold. It can be forged to the bit $c\ c$, or made separate, as is shown by Fig. 4.

The bit $c\ c$ can be regulated by using different-sized collars $f$, which can be attached to any part of the bit.

In operating the machine a belt is attached to pulley $h$, which throws the bit $c\ c$ in motion. The rail is then passed over the table $a$ against the bit $c\ c$ by hand, when the mold is formed. The table $a$ and shaft $e$ are supported by an ordinary trestle, $g$.

I claim as my invention—

The combination of the collar and bit, for the purposes described, with an adjustable semicircular table, to accommodate the twist of the stair-rail.

JOHN B. BOWDEN.

Witnesses:
    EDMUND N. HATCHER,
    CHARLES M. VANDENBARK.